(12) United States Patent
Belotserkovsky

(10) Patent No.: US 8,761,311 B2
(45) Date of Patent: *Jun. 24, 2014

(54) DATA-AIDED SYMBOL TIMING RECOVERY LOOP DECOUPLED FROM CARRIER PHASE OFFSET

(75) Inventor: Maxim Belotserkovsky, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 559 days.

This patent is subject to a terminal disclaimer.

(21) Appl. No.: 12/735,385

(22) PCT Filed: Jan. 14, 2008

(86) PCT No.: PCT/US2008/000475
§ 371 (c)(1),
(2), (4) Date: Jul. 9, 2010

(87) PCT Pub. No.: WO2009/091355
PCT Pub. Date: Jul. 23, 2009

(65) Prior Publication Data
US 2010/0283911 A1 Nov. 11, 2010

(51) Int. Cl.
*H04L 27/00* (2006.01)
(52) U.S. Cl.
USPC .......................................... 375/326; 375/320
(58) Field of Classification Search
USPC ......... 375/326, 221, 296, 298, 320–321, 346; 348/726
See application file for complete search history.

(56) References Cited

U.S. PATENT DOCUMENTS

| 5,799,037 A | 8/1998 | Strolle et al. |
| 5,872,815 A * | 2/1999 | Strolle et al. ................. 375/321 |
| 6,459,741 B1 * | 10/2002 | Grabb et al. .................. 375/261 |
| 6,614,490 B2 | 9/2003 | Hong et al. |
| 6,985,549 B1 | 1/2006 | Biracree et al. |

(Continued)

FOREIGN PATENT DOCUMENTS

WO 2005114935 12/2005

OTHER PUBLICATIONS

L. E. Franks ("Carrier and bit synchronization in data communication—a tutorial review", IEEE Transactions on communications, vol. Com-28,No. 8, Aug. 1880, pp. 1107-1121).*

(Continued)

*Primary Examiner* — Shuwang Liu
*Assistant Examiner* — Helene Tayong
(74) *Attorney, Agent, or Firm* — Robert D. Shedd; Joseph J. Opalach

(57) ABSTRACT

A receiver is an ATSC (Advanced Television Systems Committee)-receiver and comprises a staggered quadrature amplitude modulator for providing an staggered quadrature amplitude modulated (SQAM) signal from a received signal; a data-aided carrier tracking loop (CTL) and a data-aided symbol timing recovery (STR) loop. The data-aided STR loop operates such that the data-aided STR loop is now insensitive to carrier phase offset.

17 Claims, 15 Drawing Sheets

(56) References Cited

U.S. PATENT DOCUMENTS

| | | |
|---|---|---|
| 7,072,425 B2 | 7/2006 | Jun et al. |
| 7,110,475 B2 | 9/2006 | Jun |
| 7,545,888 B2 * | 6/2009 | Zhu et al. .................. 375/326 |
| 2002/0145680 A1 * | 10/2002 | Hong .......................... 348/725 |
| 2004/0081257 A1 | 4/2004 | Lin et al. |
| 2004/0136474 A1 | 7/2004 | Hwang |
| 2004/0150754 A1 | 8/2004 | Jun |
| 2004/0161056 A1 | 8/2004 | Jun et al. |
| 2005/0069048 A1 | 3/2005 | Jun et al. |
| 2006/0078071 A1 * | 4/2006 | Lee ............................ 375/326 |

OTHER PUBLICATIONS

ATSC Digital Television Standard (A/53), Revision E, with amendments No. 1 and 2, Advanced Television Systems Committee, Washington, DC 2006, Sep. 13, 2006, 133 pages.

Liu et al.: "Simulation and Implementation of US QAM-Based HDTV Channel Decoder", IEEE Transactions on Consumer Electronics, vol. 39, No. 3, pp. 676-682, Aug. 1, 1993.

ATSC Doc. A/54A, Recommended Practice: Guide to the Use of the ATSC Digital Television Standard, Advances Television Systems Committee, Washington, DC 20006, Dec. 4, 2003, 109 pages.

* cited by examiner

DATA-AIDED SYMBOL TIMING RECOVERY LOOP DECOUPLED FROM CARRIER PHASE OFFSET

This application claims the benefit, under 35 U.S.C. §365 of International Application PCT/US2008/000475, filed Jan. 14, 2008, which was published in accordance with PCT Article 21(2) on Jul. 23, 2009 in English.

BACKGROUND OF THE INVENTION

The present invention generally relates to communications systems and, more particularly, to a receiver.

In the ATSC (Advanced Television Systems Committee) standard for digital terrestrial television (DTV) in the United States (e.g., see, United States Advanced Television Systems Committee, "ATSC Digital Television Standard", Document A/53, Sep. 16, 1995), the modulation system consists of a suppressed carrier vestigial sideband (VSB) modulation with an added small in-phase pilot at the suppressed carrier frequency, 11.3 dB below the average signal power, at the lower VSB signal edge. An illustrative frequency spectrum for an ATSC VSB signal is shown in FIG. 1.

In most communications systems, such as ATSC, the receiver uses "blind" algorithms to perform carrier and timing synchronization with the transmitted waveform, where the algorithms do not use any information about the transmitted symbols. For example, an ATSC receiver utilizes the above-noted small in-phase pilot tone to achieve carrier frequency lock, after which some other blind method, such as the well-known Gardner's algorithm, is used to achieve symbol-timing lock.

Once carrier frequency lock and symbol-timing lock have been achieved, "non-blind" or data-aided methods can be used in an auxiliary capacity to maintain the carrier frequency lock and the symbol-timing lock. Data aided methods rely on (partial) knowledge of the information (symbols, bits) being transmitted.

An example of a prior art data-aided carrier tracking loop (CTL) and symbol timing recovery (STR) loop ATSC receiver architecture is shown in FIG. 2. This portion of the ATSC receiver comprises a multiplier 40, interpolator 45, demodulator 50, equalizer 55, timing phase detector 60, carrier phase detector 65, STR element 75 and CT element 70. Signal 39 is a complex sample stream comprising in-phase (I) and quadrature (Q) components representing a received VSB signal at an intermediate frequency (IF) (provided by other components of the receiver, e.g., a tuner (not shown)). It should be noted that complex signal paths are shown as double lines in the figures. In FIG. 2, the data-aided STR loop (the "inner loop" in FIG. 2) is represented by interpolator 45, demodulator 50, equalizer 55, timing phase detector 60 and STR element 75. Similarly, the data-aided CTL (the "outer loop" in FIG. 2) is represented by multiplier 40, interpolator 45, demodulator 50, equalizer 55, carrier phase detector 65 and CT element 70.

Multiplier 40 receives signal 39 and performs de-rotation of the sample stream by a calculated phase angle. For example, the in-phase and quadrature components of signal 39 are rotated by a phase. The latter is provided by signal 71, which represents particular sine and cosine values provided by CT element 70. CT element 70 comprises, e.g., a loop filter, NCO and a sin/cos table as known in the art. The output signal, 44, from multiplier 40 is applied to interpolator 45, which generates a sequence of time interpolated samples synchronized to the transmitter symbol rate. The symbol timing for interpolator 45 is adjusted by STR element 75 via signal 76. The output of interpolator 45 is applied to demodulator 50, which provides a demodulated signal to equalizer 55. Equalizer 55 provides a training/sliced signal 57 (representing the known information about the received signal, this signal is not equalized) and an equalized signal 56. The latter is also provided to other portions (not shown) of the receiver for recovery of the data conveyed therein. Both the equalized signal 56 and the training/sliced signal 57 are applied to timing phase detector 60 and carrier phase detector 65 for detecting phase differences between these signals to provide driving signals 61 and 66 for the STR loop and the CTL, respectively. Unfortunately, each of the data-aided VSB phase detectors represented by detectors 60 and 65 are sensitive to both carrier phase and symbol-timing phase, which creates undesirable coupling between the CTL and STR loops. In addition, the presence of the equalizer in the STR loop may lead to situations where the equalizer and the STR loop "chase each other" causing a decrease in performance.

A traditional way to solve the problem of coupled CTL and STR loops is to assign much higher relative gain to one of the loops (e.g., to the CTL—the outer loop). This does not remove the coupling between the CTL and the STR loop, but does make the receiver stable. However, an obvious undesirable result of making one loop much slower than the other is the decrease in tracking ability, as well as creating the possibility for competition between the equalizer and the two loops.

SUMMARY OF THE INVENTION

As noted above, each of the data-aided Vestigial Sideband (VSB) phase detectors are sensitive to both carrier phase and symbol-timing phase, which creates undesirable coupling between the carrier tracking loop (CTL) and symbol timing recovery (STR) loop. However, I have realized that it is possible to decouple the STR loop from the CTL, i.e., the STR loop is now insensitive to carrier phase offset without any sacrifices in performance (such as tracking ability). In particular, and in accordance with the principles of the invention, a receiver comprises a staggered quadrature amplitude modulator for providing a staggered quadrature amplitude modulated signal from a received signal; carrier tracking loop, for tracking a carrier frequency in the staggered quadrature amplitude modulated signal, and a data-aided symbol timing recovery loop for tracking symbol timing in the staggered quadrature amplitude modulated signal wherein the symbol timing recovery loop includes a filter for removing a phase response symmetry in a signal derived from the staggered quadrature amplitude modulated signal for providing a filter output signal; and a timing phase detector responsive to the filter output signal for driving the symbol timing recovery loop, whereby the data-aided symbol timing recovery loop is now insensitive to carrier phase offset.

In an embodiment of the invention, the receiver is an ATSC-receiver and comprises a staggered quadrature amplitude modulator (SQAM), a data-aided CTL and a data-aided STR loop. As described below, and in accordance with the principles of the invention, the data-aided STR loop operates such that the data-aided STR loop is now insensitive to carrier phase offset.

In view of the above, and as will be apparent from reading the detailed description, other embodiments and features are also possible and fall within the principles of the invention.

DETAILED DESCRIPTION

Other than the inventive concept, the elements shown in the figures are well known and will not be described in detail. Also, familiarity with television broadcasting, receivers and video encoding is assumed and is not described in detail herein. For example, other than the inventive concept, familiarity with current and proposed recommendations for TV standards such as NTSC (National Television Systems Committee), PAL (Phase Alternation Lines), SECAM (SEquential Couleur Avec Memoire) and ATSC (Advanced Television Systems Committee) (ATSC) is assumed. Further information on ATSC broadcast signals can be found in the following ATSC standards: Digital Television Standard (A/53), Revision C, including Amendment No. 1 and Corrigendum No. 1, Doc. A/53C; and *Recommended Practice: Guide to the Use of the ATSC Digital Television Standard* (A/54). Likewise, other than the inventive concept, transmission concepts such as eight-level vestigial sideband (8-VSB), Quadrature Amplitude Modulation (QAM), orthogonal frequency division multiplexing (OFDM) or coded OFDM (COFDM)), and receiver components such as a radio-frequency (RF) front-end, receiver section, low noise block, tuners, demodulators, Hilbert filters, carrier tracking loop, correlators, leak integrators and squarers, etc., is assumed. Similarly, other than the inventive concept, formatting and encoding methods (such as Moving Picture Expert Group (MPEG)-2 Systems Standard (ISO/IEC 13818-1)) for generating transport bit streams are well-known and not described herein. Also, those skilled in the art appreciate that carrier recovery involves processing in the real and the complex domains. It should also be noted that the inventive concept may be implemented using conventional programming techniques, which, as such, will not be described herein. Finally, like-numbers on the figures represent similar elements.

Figure 2:
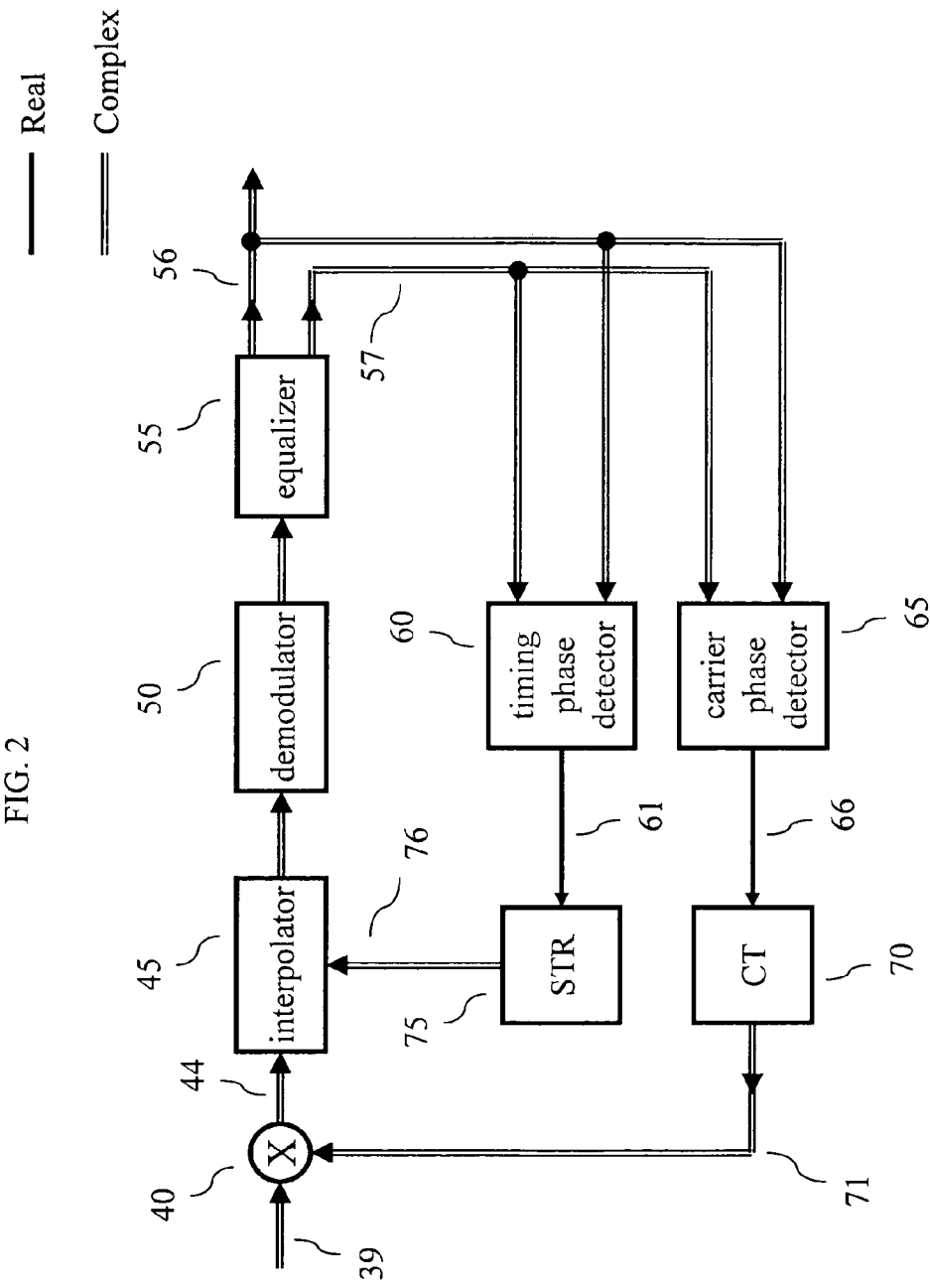
FIG. 2 shows an example of a prior art data-aided CTL and STR loop.
Figure 3:
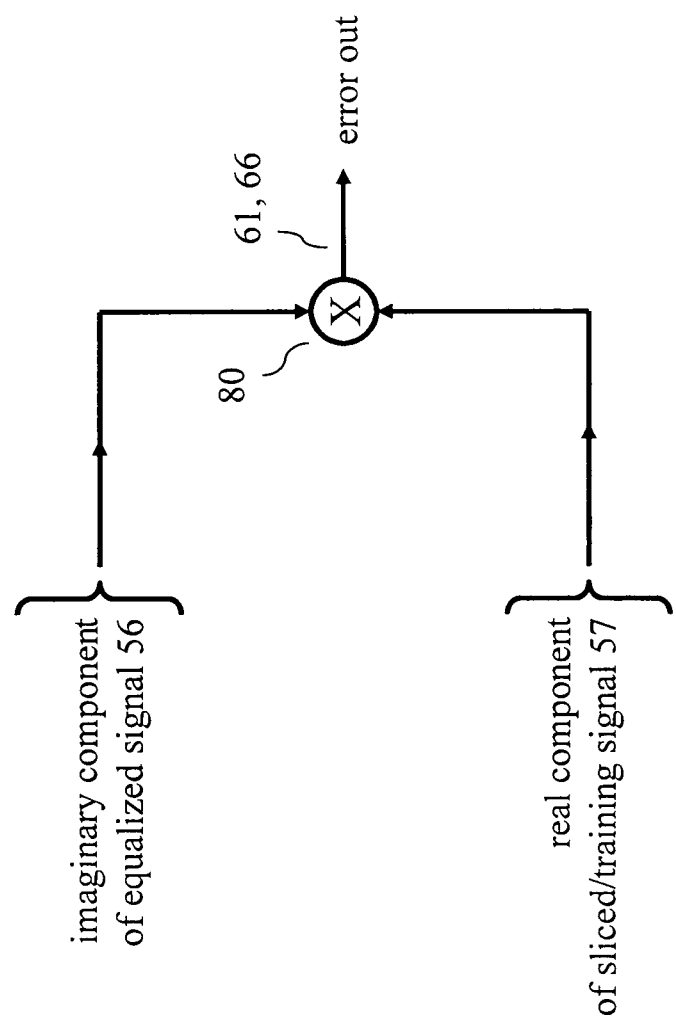
FIGS. 3 and 4 show examples of detectors for use in a CTL and STR loop.
Figure 4:
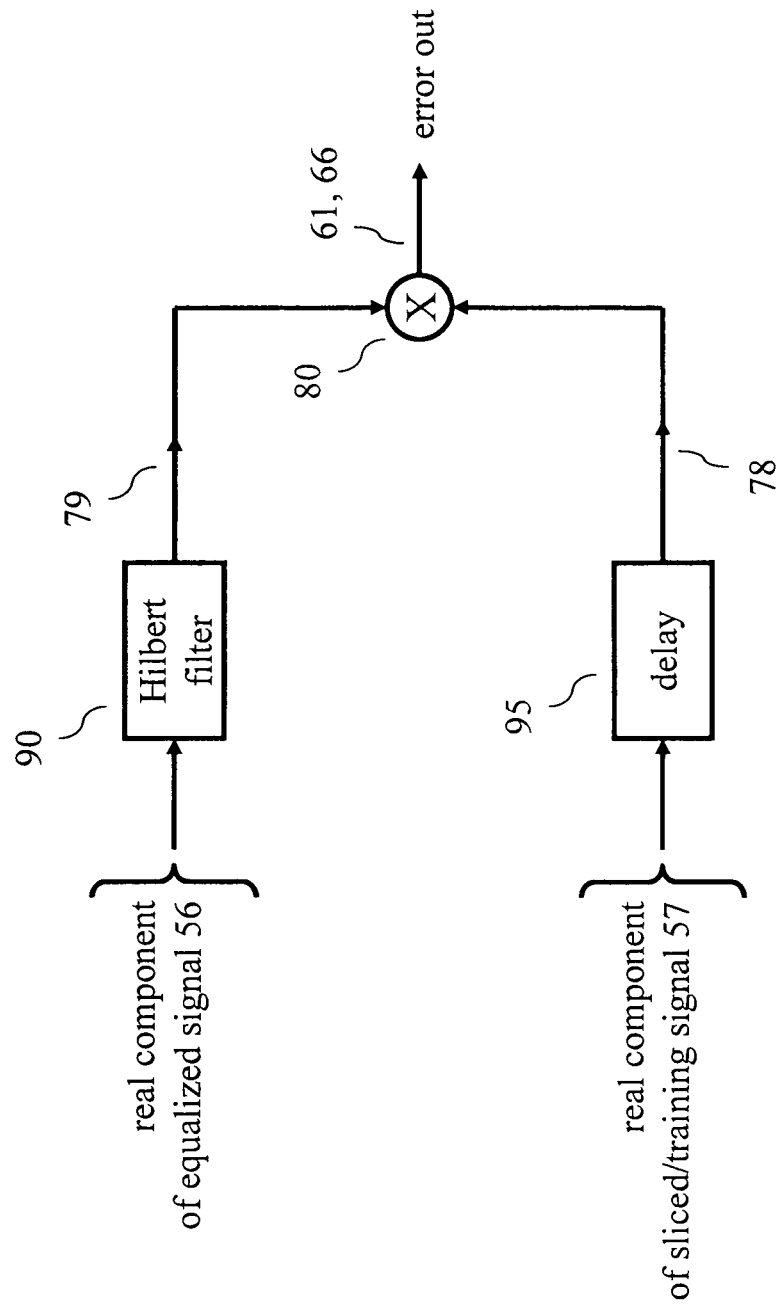
Figure 5:
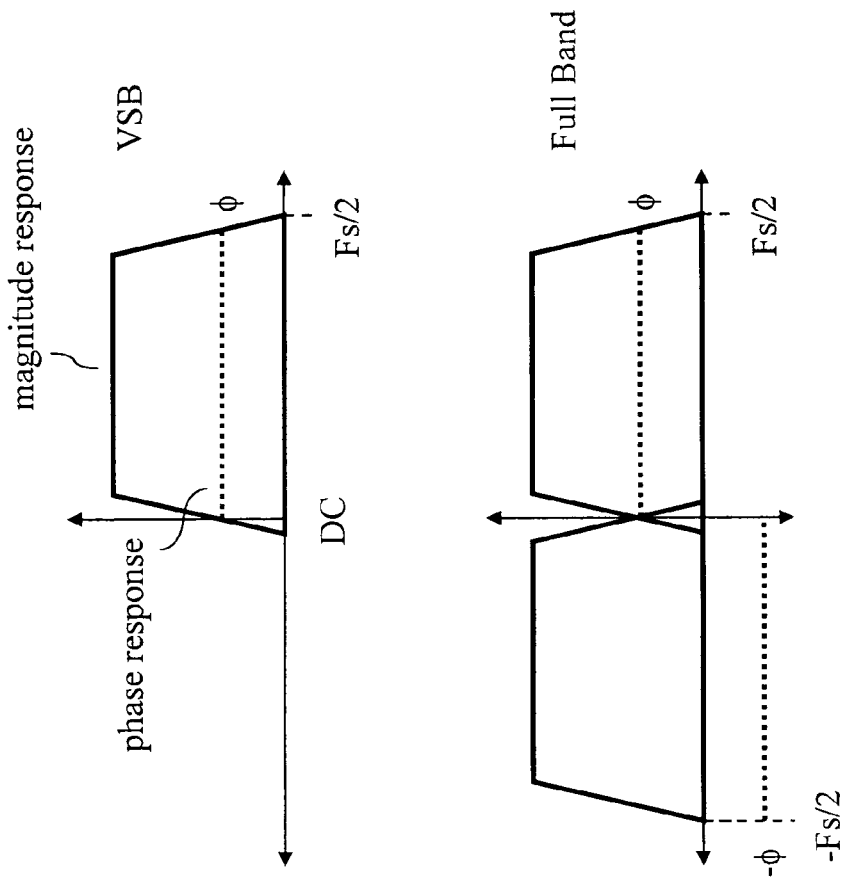
FIGS. 5 and 6 illustrate carrier phase and symbol timing offsets.
Figure 6:
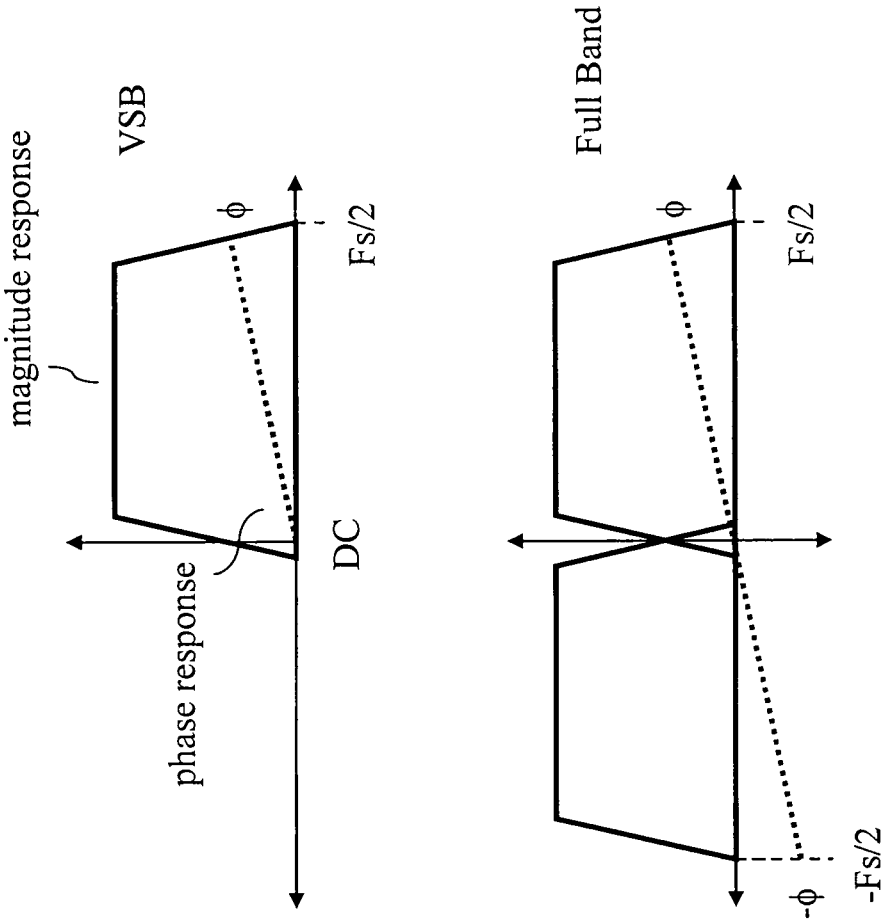

Before describing the inventive concept, FIGS. 3 and 4 show different embodiments of both a timing phase detector and a carrier phase detector for use in elements 60 and 65 of FIG. 2. The detector of FIG. 3 assumes that the imaginary component of the received signal is a readily available product of the receiver operation. The detector of FIG. 3 comprises multiplier 80, which multiplies the imaginary component of equalized signal 56 of FIG. 2 with the real component of sliced/training signal 57 for providing error signal 61 or error signal 66 for driving STR element 75 and CT element 70, respectively. In contrast, the detector of FIG. 4 uses a Hilbert filter 90 to create the imaginary signal component 79 from the normally available real signal component of equalized signal 56. In this regard, delay element 95 provides a matching delay for providing delayed signal 78. As before for the detector of FIG. 3, the detector of FIG. 4 comprises multiplier 80, which multiplies signals 78 and 79 for providing error signal 61 or error signal 66 for driving STR element 75 and CT element 70, respectively. Both the detectors of FIGS. 3 and 4 (as well as other detectors that may be based on similar principles) can be shown to be sensitive to both carrier and symbol timing phase offsets, thus making the carrier and timing recovery loops coupled to each other. In a traditional architecture, such as that shown in FIG. 2, both detectors rely on the symmetry of phase response of the full band received signal. In this regard, FIG. 5 depicts a typical signal (e.g., signal 44 of FIG. 2) with a flat phase response shift indicative of a complex carrier phase offset. The VSB spectrum is illustrated in the top portion of FIG. 5 and the full band is illustrated in the bottom portion of FIG. 5. In contrast, FIG. 6 shows similar illustrations for what the phase response would be if there was a symbol-timing phase offset at the output of interpolator 45 of FIG. 2. Despite the different nature and shape of the two phase responses, the error detectors of FIGS. 3 and 4 will respond to the two offsets in a similar way.

As noted above, each of the data-aided Vestigial Sideband (VSB) phase detectors are sensitive to both carrier phase and symbol-timing phase, which creates undesirable coupling between the carrier tracking loop (CTL) and symbol timing recovery (STR) loop. However, I have realized that it is possible to decouple the STR loop from the CTL, i.e., the STR loop is now insensitive to carrier phase offset without any sacrifices in performance (such as tracking ability). In particular, and in accordance with the principles of the invention, a receiver comprises a staggered quadrature amplitude modulator for providing a staggered quadrature amplitude modulated signal from a received signal; a carrier tracking loop, for tracking a carrier frequency in the staggered quadrature amplitude modulated signal, and a data-aided symbol timing recovery loop for tracking symbol timing in the staggered quadrature amplitude modulated signal wherein the symbol timing recovery loop includes a filter for removing a phase response symmetry in a signal derived from the staggered quadrature amplitude modulated signal for providing a filter output signal; and a timing phase detector responsive to the filter output signal for driving the symbol timing recovery loop, whereby the data-aided symbol timing recovery loop is now insensitive to carrier phase offset.

Figure 1:
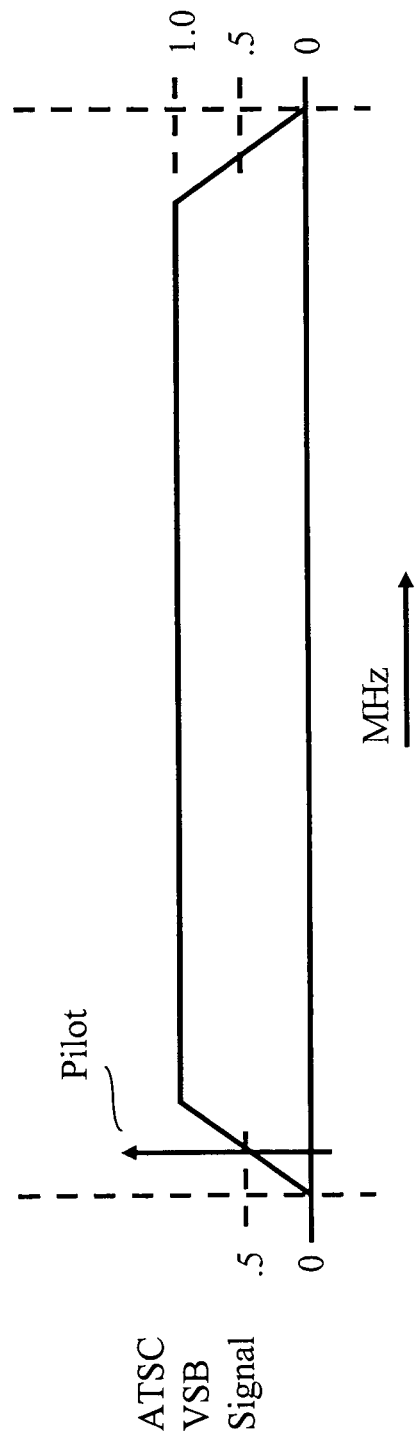
FIG. 1 shows an illustrative ATSC VSB signal spectrum.
Figure 7:
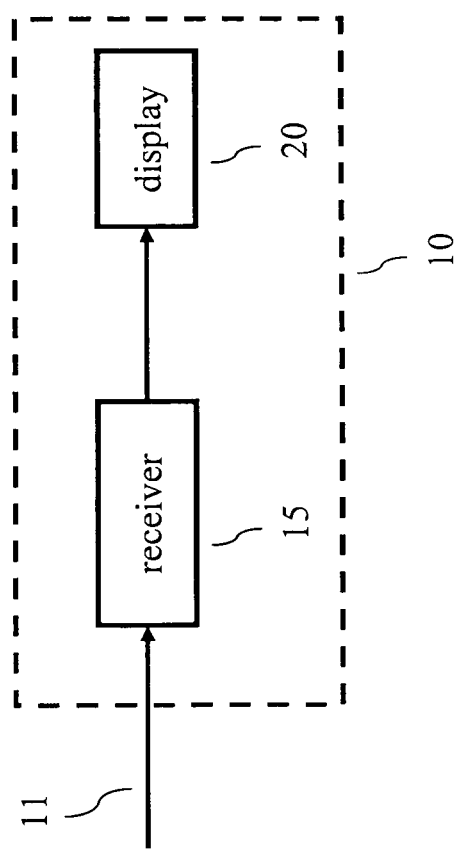
FIG. 7 shows an illustrative high-level block diagram of an apparatus embodying the principles of the invention.

A high-level block diagram of an illustrative apparatus 10 in accordance with the principles of the invention is shown in FIG. 7. Apparatus 10 includes a receiver 15 and a display 20. Illustratively, receiver 15 is an ATSC-compatible receiver. It should be noted that receiver 15 may also be NTSC (National Television Systems Committee)-compatible, i.e., have an NTSC mode of operation and an ATSC mode of operation such that apparatus 10 is capable of displaying video content from an NTSC broadcast or an ATSC broadcast. For simplicity in describing the inventive concept, only the ATSC mode of operation is described herein. Receiver 15 receives a broadcast signal 11 (e.g., via an antenna (not shown)) for processing to recover therefrom, e.g., an HDTV (high definition TV) video signal for application to display 20 for viewing video content thereon. As noted earlier, an illustrative spectrum for an ATSC VSB signal is shown in FIG. 1.

Figure 8:
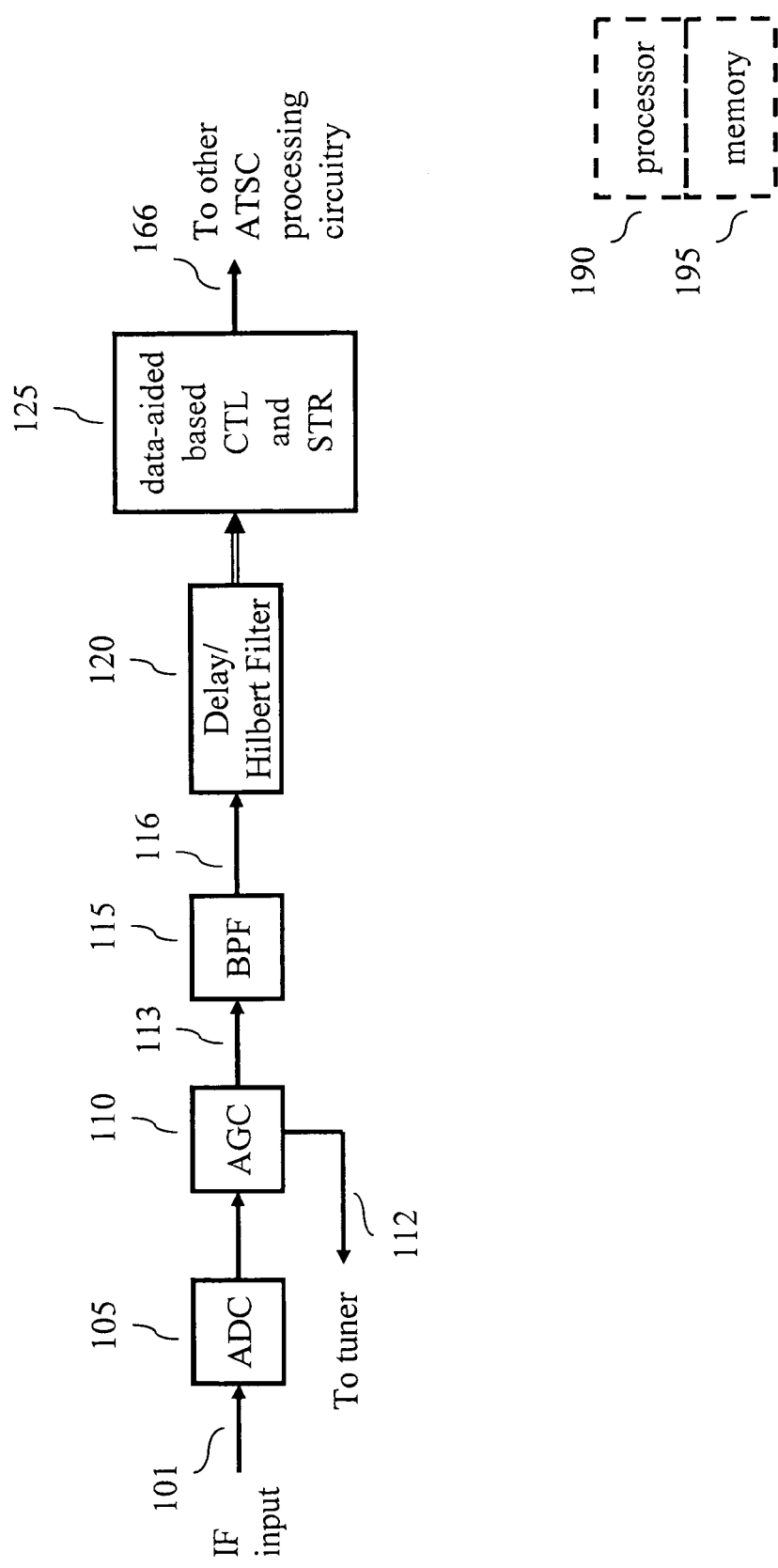
FIG. 8 shows a portion of a receiver embodying the principles of the invention.

Turning now to FIG. 8, that relevant portion of receiver 15 in accordance with the principles of the invention is shown. In particular, receiver 15 includes analog-to-digital converter (ADC) 105, automatic gain control (AGC) 110, band-pass filter (BPF) 115, delay/Hilbert filter 120 and data-aided based carrier and tracking loop (CTL) and symbol timing recovery (STR) loop 125. Receiver 15 is a processor-based system and includes one, or more, processors and associated memory as represented by processor 190 and memory 195 shown in the form of dashed boxes in FIG. 8. In this context, computer programs, or software, are stored in memory 195 for execution by processor 190. The latter is representative of one, or more, stored-program control processors and these do not have to be dedicated to the receiver function, e.g., processor 190 may also control other functions of receiver 15 (or apparatus 10). Memory 195 is representative of any storage device, e.g., random-access memory (RAM), read-only memory (ROM), etc.; may be internal and/or external to receiver 15; and is volatile and/or non-volatile as necessary.

Input signal 101 represents a digital VSB modulated signal in accordance with the above-mentioned "ATSC Digital Television Standard" and is centered at a specific IF (Intermediate Frequency) of $F_{IF}$ Hertz (provided by a tuner (not shown)). Input signal 101 is sampled by ADC 105 for conversion to a sampled signal, which is then gain controlled by AGC 110. The latter is noncoherent and is a mixed mode (analog and digital) loop that provides a first level of gain control (prior to carrier tracking), symbol timing and sync detection of the VSB signal included within signal 101. AGC 110 basically compares the absolute values of the sampled signal from ADC 105 against a predetermined threshold, accumulates the error and feeds that information, via signal 112, back to the tuner (not shown) for gain control prior to ADC 105. As such, AGC 110 provides a gain controlled signal 113 to BPF 115, which is centered at the IF frequency ($F_{IF}$) and has a bandwidth equal to 6 MHz (millions of hertz). The output signal 116 from BPF 115 then applied to Delay/Hilbert filter element 120, which includes a Hilbert filter and an equivalent delay line that matches the Hilbert filter processing delay. As known in the art, a Hilbert Filter is an all-pass filter that introduces a −90° phase shift to all input frequencies greater than 0 (and a +90° degree phase shift to negative frequencies). The Hilbert filter allows recovery of the quadrature component of the output signal 116 from BPF 115. In order for the CTL to correct the phase and lock to the ATSC IF carrier both the in-phase and quadrature components of the signal are needed. The output signal 121 from delay/Hilbert filter element 120 is a complex sample stream comprising in-phase (I) and quadrature (Q) components. It should be noted that complex signal paths are shown as double lines in the figures. Output signal 121 is applied to data-aided based CLR and STR element 125, which processes output signal 121 in accordance with the principles of the invention to down convert the IF signal to baseband and correct for carrier timing and symbol timing. Data-aided based CTL and STR loop element 125 provides a down-converted received signal 166. The latter is provided to other portions (not shown) of receiver 15 for recovery of the data conveyed therein.

Figure 9:
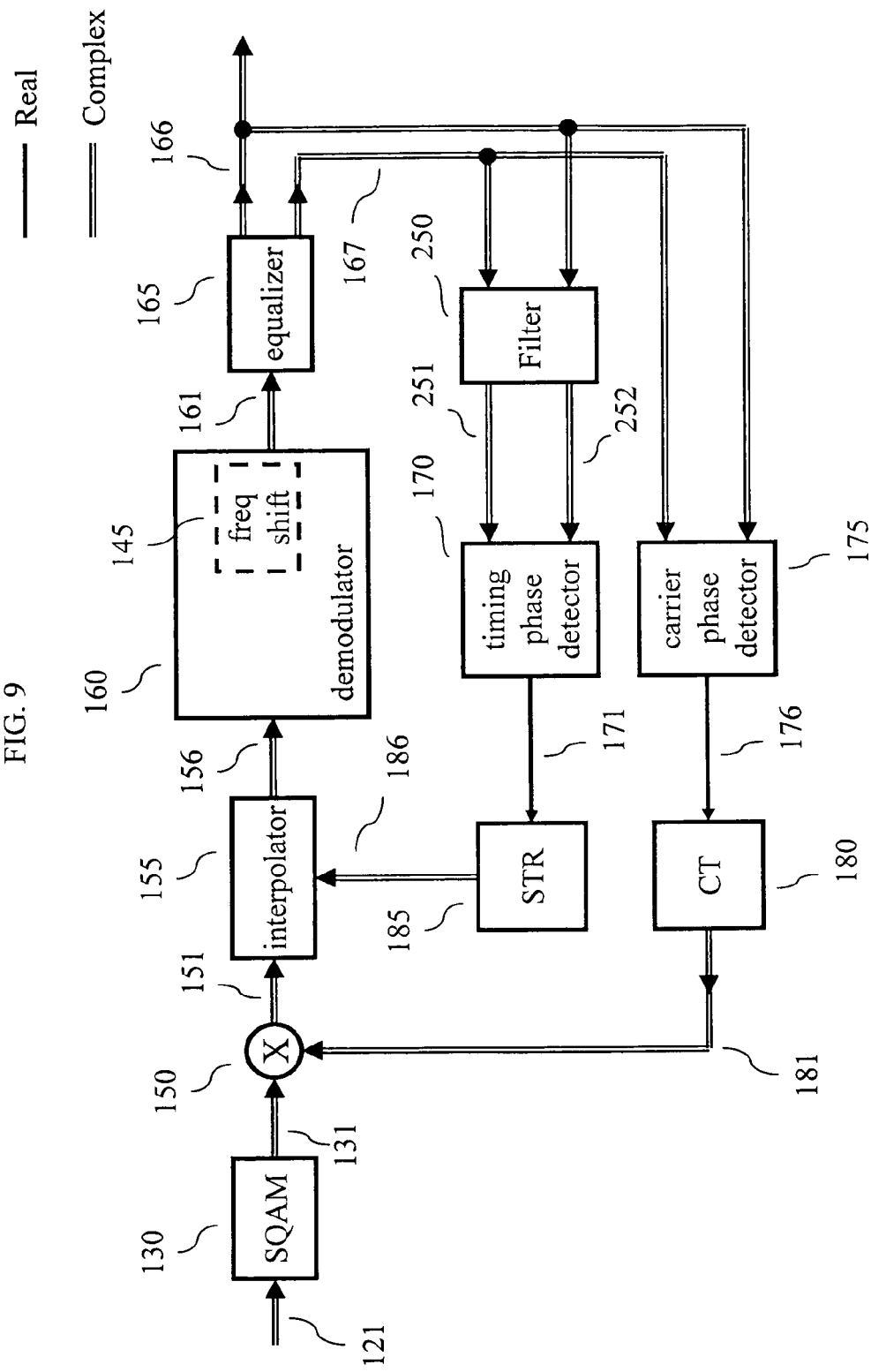
FIG. 9 shows an illustrative embodiment of a data-aided CTL and STR element embodying the principles of the invention for use in the receiver of FIG. 8.

Reference should now be made to FIG. 9, which shows an illustrative embodiment of data-aided based CTL and STR element 125 in accordance with the principles of the invention. Data-aided based CTL and STR element 125 comprises Staggered Quadrature Amplitude Modulator (SQAM) element 130, multiplier (derotator) 150, interpolator 155, demodulator 160, equalizer 165, filter 250, timing phase detector 170, carrier phase detector 175, carrier tracking (CT) element 180 and symbol timing recovery (STR) element 185. For the purposes of explanation, SQAM element 130 is illustrated as being a part of element 125. However, the inventive concept is not so limited and SQAM element 130 could have been shown as a separate element apart from data-aided based CTL and STR element 125. As described below, and in accordance with the principles of the invention, data-aided based CTL and STR element 125 operates such that at least the STR loop operates independently of the CTL loop. In FIG. 9, the data-aided STR loop (the "inner loop" in FIG. 9) is represented by interpolator 155, demodulator 160, equalizer 165, timing filter 250, timing phase detector 170 and STR element 185. Similarly, the data-aided CTL (the "outer loop" in FIG. 9) is represented by multiplier 150, interpolator 155, demodulator 160, equalizer 165, carrier phase detector 175 and CT element 180.

Figure 10:
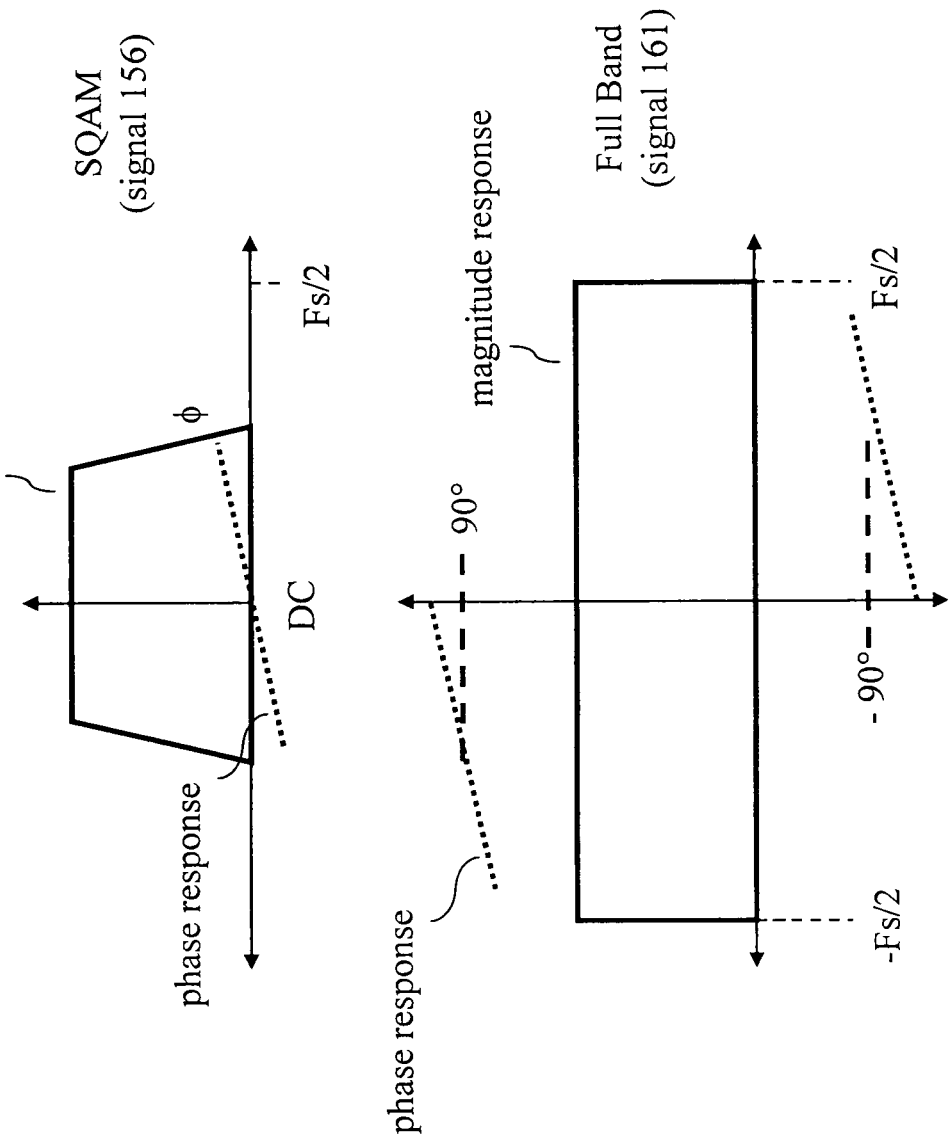
FIG. 10 illustrates carrier phase and symbol timing offsets.

It should be observed from FIG. 9 that output signal 121 is applied to SQAM element 130, which provides staggered QAM signal 131 to multiplier 150. Staggered QAM signal 131 is, in essence, the same as a VSB signal only with the center of its spectrum (rather than the lower band-edge) located near DC. With this change in architecture, the phase response shift due to a carrier phase offset is not affected, but the phase response due to the timing phase offset is, as illustrated in FIG. 10. The spectrum of the complex SQAM signal 156 at the interpolator output is illustrated in the top portion of FIG. 10 and the full band spectrum of the imaginary component of demodulated signal 161 is illustrated in the bottom portion of FIG. 10. It should be noted that for illustration only the full-band spectrum shown for demodulated signal 161 assumes the channel is flat (in the absence of micro-reflections) and the only imperfections are caused by symbol timing phase offset and carrier phase offset. In this regard, it is assumed that equalizer 165 does not significantly change the phase response. As such, the remainder of this description will refer to equalizer signal 166. With respect to equalized signal 166, it should be noted that the phase response shown in FIG. 10 is symmetric around −90° (for positive frequencies) and around 90° (for negative frequencies). It can be shown that this change in symmetry results in the detectors shown in FIGS. 3 and 4 for use in carrier phase detector 175 now being insensitive to the timing phase offset, while retaining their sensitivity to carrier phase offset. Thus, processing the received signal with SQAM element 130 now decouples the CTL from the STR loop in accordance with the principles of the invention.

Returning to FIG. 9, multiplier 150 receives SQAM signal 131 and performs de-rotation of the sample stream by a calculated phase angle. For example, the in-phase and quadrature components of signal 131 are rotated by a phase. The latter is provided by signal 181, which represents particular sine and cosine values provided by CT element 180. CT element 180 comprises, e.g., a loop filter, NCO and a sin/cos table as known in the art. The output signal, 151, from multiplier 150 is applied to interpolator 155, which generates a sequence of time interpolated samples synchronized to the transmitter symbol rate. The symbol timing for interpolator 155 is adjusted by STR element 185 via signal 186. The output of interpolator 155, signal 156, is applied to demodulator 160, which provides demodulated signal 161. The latter represents received versions of the transmitted symbols. It should be noted that demodulator 160 illustratively includes frequency shift (freq shift) element 145 for shifting up (also referred to as translating or converting) signal 156 to its traditional VSB position before the received symbols are extracted. This frequency shift element 145 is represented in dashed-line form. Demodulated signal 161 is applied to equalizer 165, which equalizes the signal to provide equalized signal 166 and also provides sliced/training signal 167 (representing the known information about the received signal). Equalized signal 166 is also provide to other portions (not shown) of receiver 15 for further processing and recovering of the content conveyed therein. In addition, and as can be observed from FIG. 9, equalized signal 166 and sliced/training signal 167 are applied to both timing phase detector 170 (via filter 250) and carrier phase detector 175 for detecting phase differences between these signals to provide driving signals 171 and 176 for the STR loop and the CTL, respectively. As described above, carrier phase detector 175 is similar to the embodiments shown in FIG. 3 or FIG. 4 and operates independent of symbol timing phase offset in accordance with the principles of the invention. Likewise, timing phase detector 175 is similar to the embodiment shown in FIG. 3 and—as a result of filter 250—is sensitive to timing phase offset but insensitive to carrier phase offset in accordance with the principles of the invention.

Figure 11:
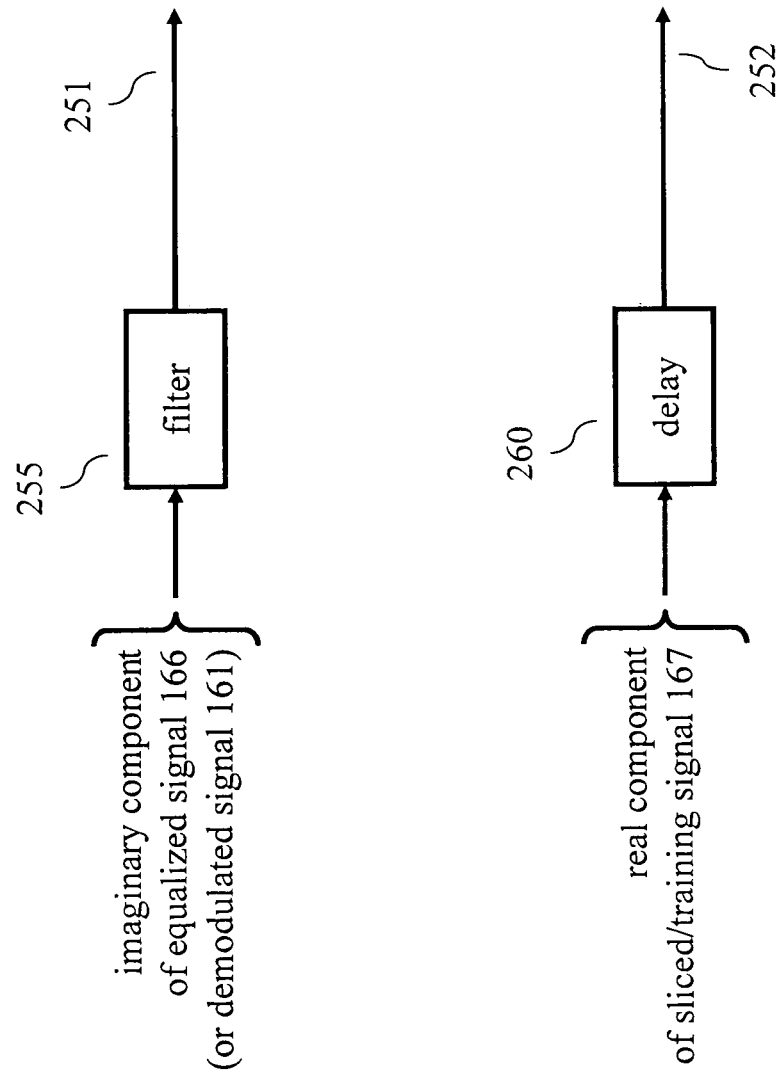
FIG. 11 shows in illustrative embodiment of a timing phase detector in accordance with the principles of the invention.
Figure 12:
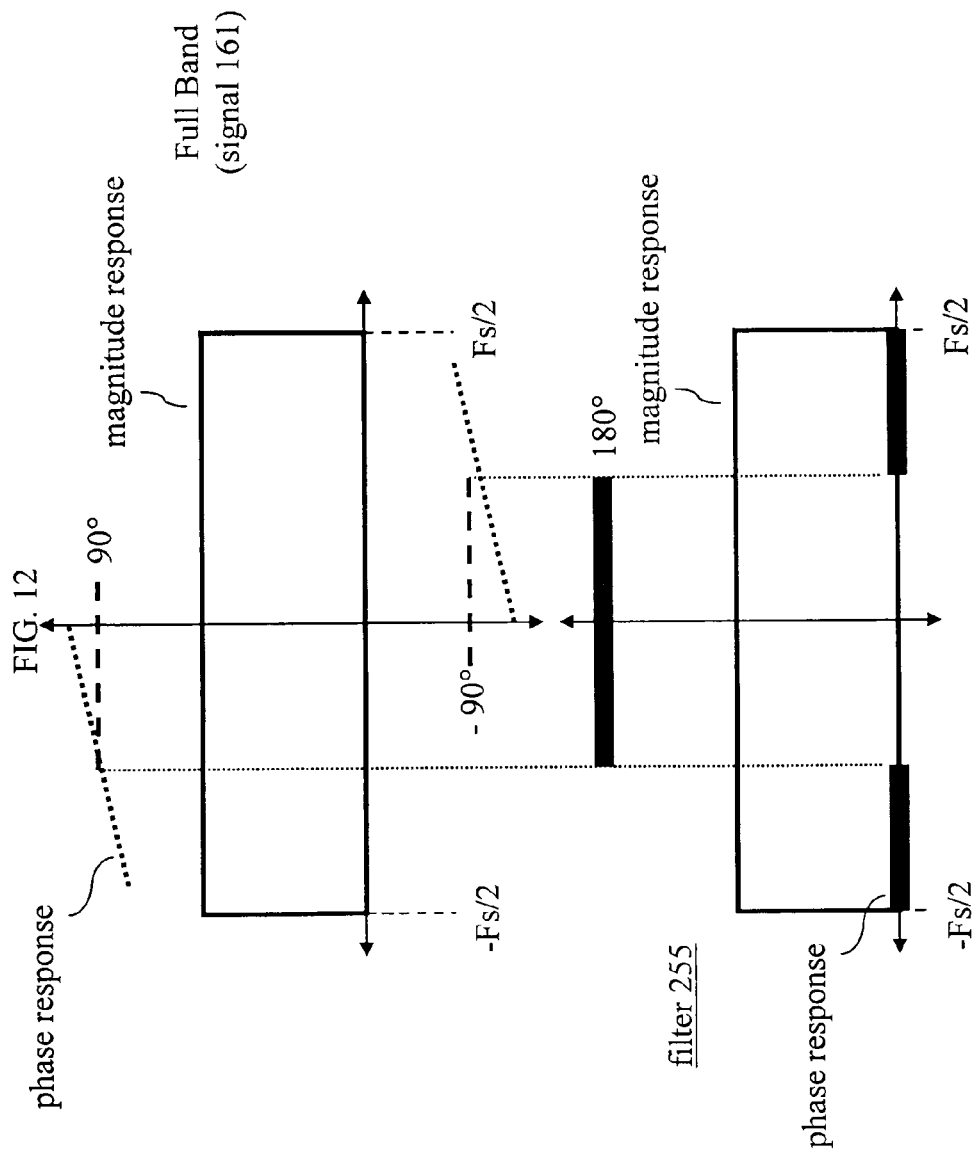
FIG. 12 shows a filter response for use in filter 250 in accordance with the principles of the invention.

Turning now to FIG. 11, an illustrative filter 250 in accordance with the principles of the invention. Filter 250 comprises a filter 255 and a delay element 260 for matching the processing delay of filter 255. Filter 255 processes the imaginary component of equalized signal 166 (or the imaginary component of the demodulated signal provided by demodulator 160). Referring now to FIG. 12, the full band spectrum for the imaginary component of demodulated signal 161 is again shown, this time in the top portion of FIG. 12. The bottom portion of FIG. 12 shows the ideal response of filter 255. As can be observed from FIG. 12, the magnitude response of filter 255 is flat across the band; while the phase response of filter 255 is constructed so as to undo the symmetry of the positive and negative half of the phase response of the signal shown in the upper portion of FIG. 12. It can be easily seen by those skilled in the art that the response of filter 255 in FIG. 12 makes timing phase detector 170 of FIG. 11 sensitive to the timing phase offset, while keeping it insensitive to a carrier phase offset. Having shown the idealized filter response of filter 255, a practical (realizable) implementation of filter 255 is easily achieved using known filter design techniques to those skilled in the art. As a result of the filter response shown in the bottom portion of FIG. 12, timing phase detector 170 and carrier phase detector 175 are now completely decoupled from each other—while allowing for the carrier timing offset and the symbol timing offset to each be tracked independently within receiver 15 of FIG. 7. The output signals 251 and 252 are applied to timing phase detector 170, which detects phase differences between these signals to provide driving signal 171 for the STR loop.

Figure 13:
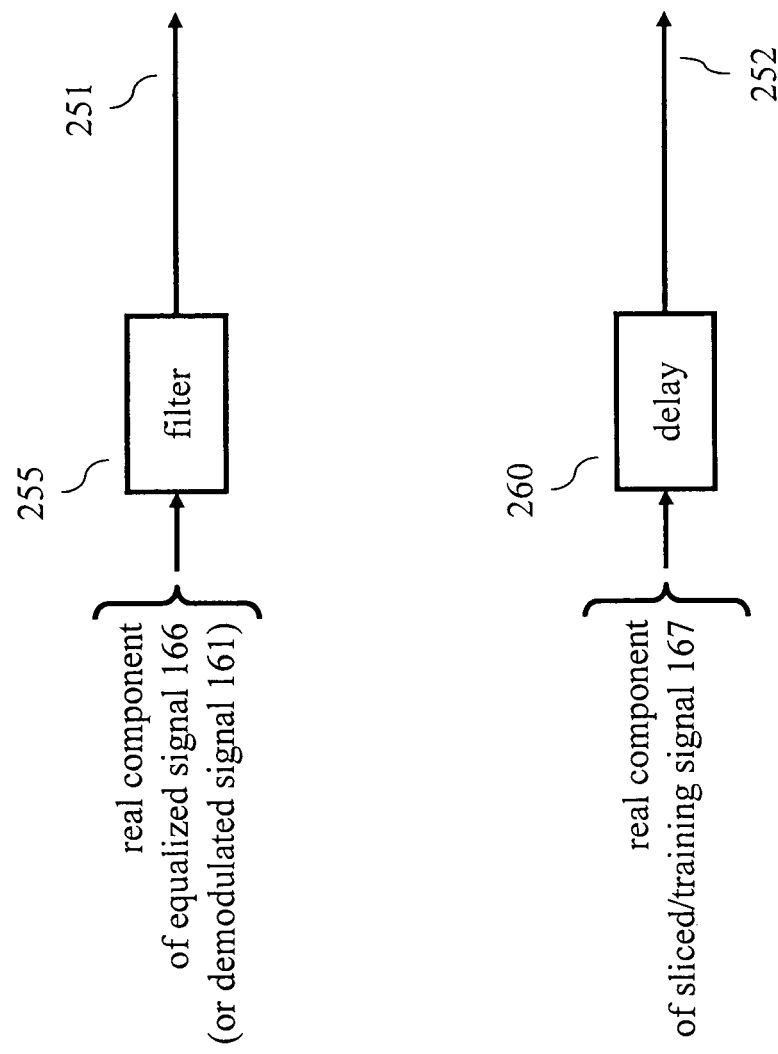
FIG. 13 shows another illustrative embodiment of a timing phase detector in accordance with the principles of the invention.

An alternative form of filter 250 is shown in FIG. 13. This embodiment of filter 250 operates on real signal components as shown. In this regard, timing phase detector 175 is similar to the embodiment shown in FIG. 4, which includes a Hilbert filter and corresponding delay element.

Figure 14:
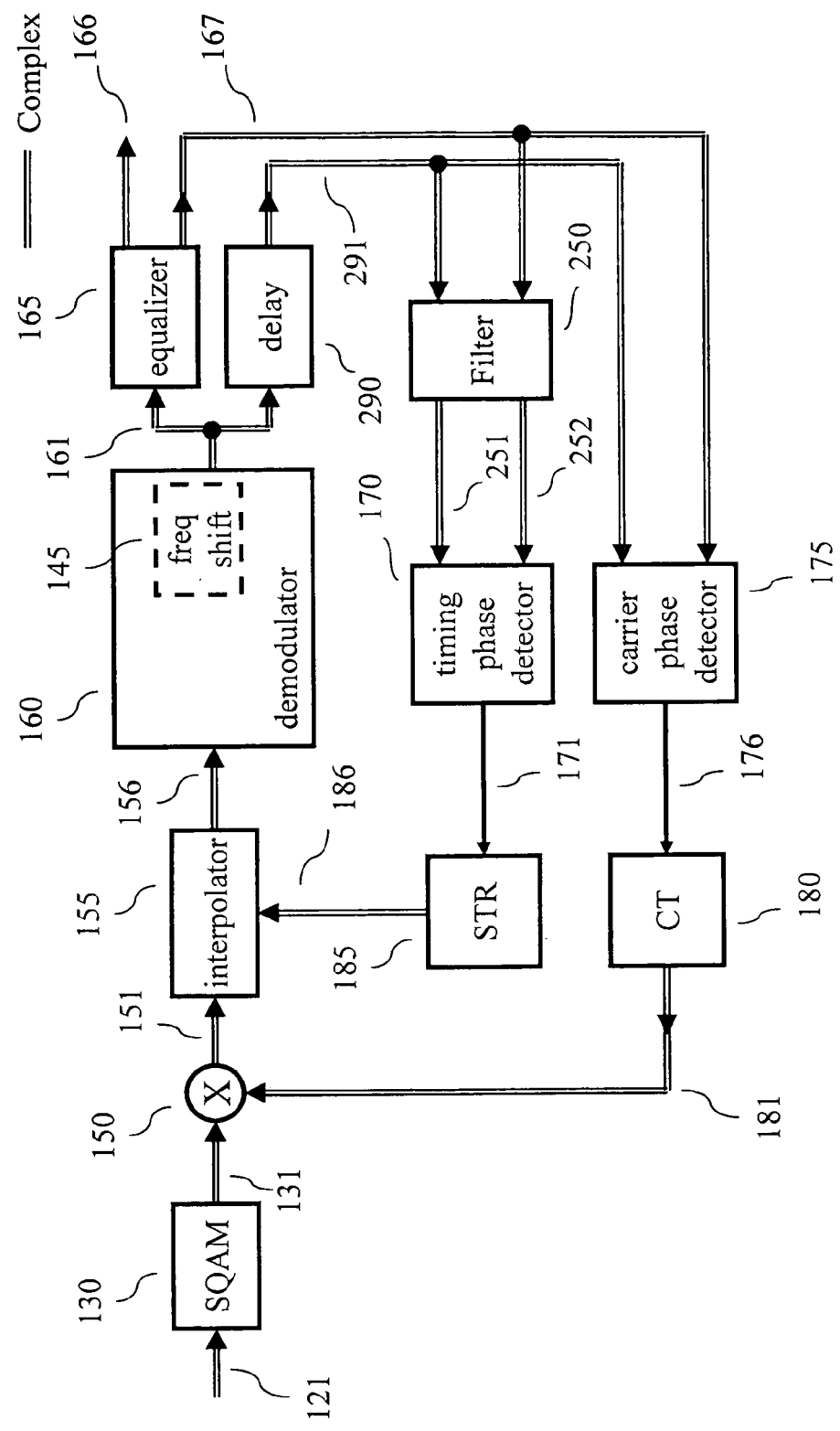
FIG. 14 shows another illustrative embodiment of a data-aided CTL and STR element embodying the principles of the invention for use in the receiver of FIG. 8.

As indicated in FIGS. 11 and 13, filter 250 (and also carrier phase detector 175) can also operate on demodulated signal 161. This alternative embodiment of data-aided based CTL and STR element 125 is shown in FIG. 14. As can be observed from FIG. 14, this embodiment includes delay element 290 to compensate for the processing delay of equalizer 165. This advantageously removes the equalizer from the loops since only the estimates of the transmitted symbols, e.g., the sliced data or training signals (167), are used by the loops.

Figure 15:
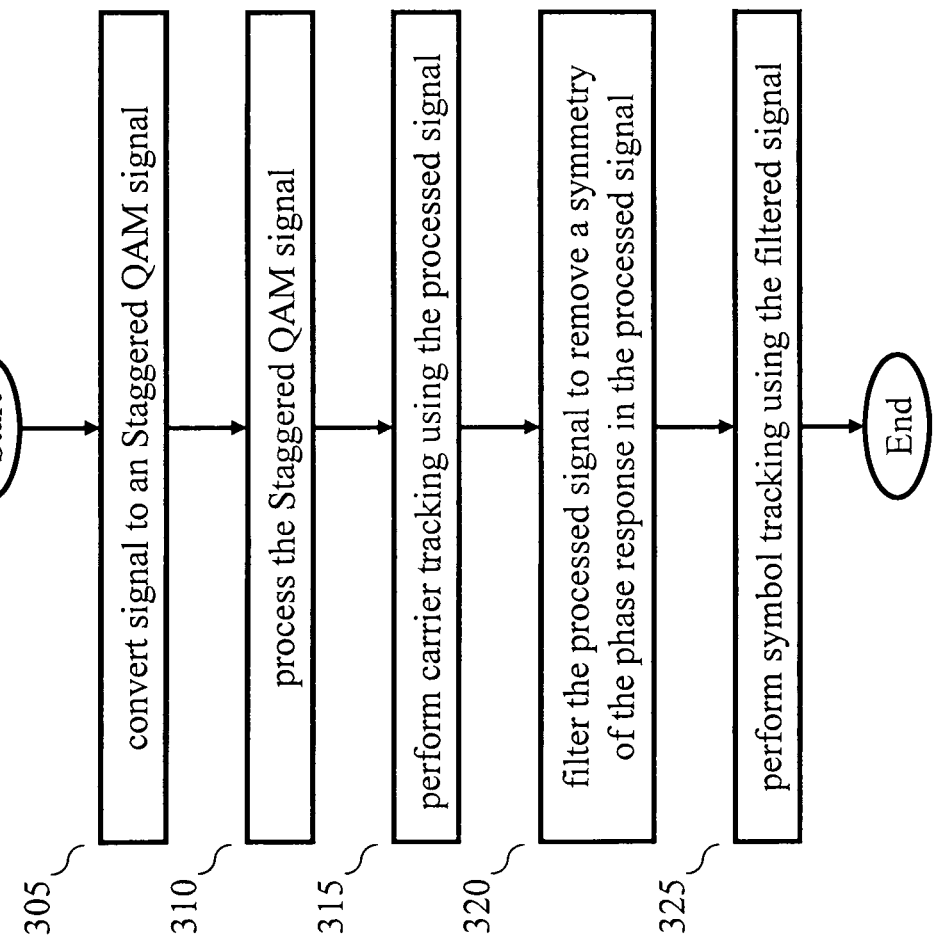
FIG. 15 shows an illustrative method in accordance with the principles of the invention.

Turning now to FIG. 15, an illustrative flow chart in accordance with the principles of the invention is shown. In step 305, receiver 15 converts a received signal to a Staggered QAM signal for further processing. In step 310, receiver 15 processes the Staggered QAM signal (e.g., with demodulator 160, with equalizer 165, etc.) to provide a processed signal. In step 315, receiver 15 performs carrier tracking using the processed signal. In step 320, receiver 15 filters the processed signal to remove a symmetry of the phase response in the processed signal. Finally, in step 325, receiver 15 performs symbol tracking using the filtered signal.

As described above, and in accordance with the principles of the invention, a receiver is able to operate such that the data-aided STR is at least decoupled from the CTL. It should be noted that although the inventive concept was described in terms of a data-aided carrier tracking loop, the invention is not so limited and, e.g., applies also to a carrier tracking loop, e.g., a CTL that uses a blind method to achieve carrier phase or frequency lock such as that relying on the ATSC pilot tone.

It should also be noted that groupings of components for particular elements described and shown herein are merely illustrative. For example, although FIG. 7 shows a display 20 internal to apparatus 10 (such as in a television (TV) set), this is not required and, e.g., display 20 could be external to apparatus 10 and, indeed, located further away. For example, apparatus 10 could be a set-top box or server which further distributes a signal for viewing on display 20.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied in one, or more, integrated circuits (ICs). Similarly, although shown as separate elements, any or all of the elements (e.g., of FIGS. 8, 9 and 14) may be implemented in a stored-program-controlled processor, e.g., a digital signal processor, which executes associated software, e.g., corresponding to one, or more, of the steps shown in, e.g., FIG. 15. Further, the principles of the invention are applicable to other types of communications systems, e.g., satellite, Wireless-Fidelity (Wi-Fi), cellular, etc. Indeed, the inventive concept is also applicable to stationary or mobile receivers. It is therefore to be understood that numerous modifications may be made to the illustrative embodiments and that other arrangements may be devised without departing from the spirit and scope of the present invention as defined by the appended claims.

The invention claimed is:

1. Apparatus for use in a receiver, the apparatus comprising;
    a staggered quadrature amplitude modulator for providing a staggered quadrature amplitude modulated signal from a received signal;
    a carrier tracking loop, for tracking a carrier frequency in the staggered quadrature amplitude modulated signal; and
    a data-aided symbol timing recovery loop for tracking symbol timing in the staggered quadrature amplitude modulated signal wherein the symbol timing recovery loop includes
    a filter for removing a phase response symmetry in a signal derived from the staggered quadrature amplitude modulated signal for providing a filter output signal, wherein the filter is sensitive to a timing phase offset, while keeping the filter insensitive to a carrier phase offset, and wherein the filter comprises a Hilbert filter that operates on a real signal component of the signal derived from the staggered quadrature amplitude modulated signal; and a timing phase detector responsive to the filter output signal for driving the symbol timing recovery loop.

2. The apparatus of claim 1, wherein the carrier tracking loop is a data-aided carrier tracking loop.

3. The apparatus of claim 1, wherein the data-aided symbol timing recovery loop further comprises:
a multiplier for derotating the staggered quadrature amplitude modulated signal for providing a derotated staggered quadrature amplitude modulated signal;
an interpolator responsive to the derotated staggered quadrature amplitude modulated signal for providing an interpolated signal;
a demodulator for demodulating the interpolated signal for providing a demodulated signal;
an equalizer for equalizing the demodulated signal for providing an equalized signal;
wherein the filter removes the phase response symmetry from the equalized signal.

4. The apparatus of claim 3, wherein the demodulator translates the interpolated signal back to a vestigial sideband modulated signal before providing the demodulated signal.

5. The apparatus of claim 1, wherein the data-aided symbol timing recovery loop further comprises:
a multiplier for derotating the staggered quadrature amplitude modulated signal for providing a derotated staggered quadrature amplitude modulated signal;
an interpolator responsive to the derotated staggered quadrature amplitude modulated signal for providing an interpolated signal; and
a demodulator for demodulating the interpolated signal for providing a demodulated signal;
wherein the filter removes the phase response symmetry from the demodulated signal.

6. The apparatus of claim 5, wherein the demodulator translates the interpolated signal back to a vestigial sideband modulated signal before providing the demodulated signal.

7. The apparatus of claim 1, wherein the received signal is an ATSC (Advanced Television Systems Committee) VSB (Vestigial Sideband) modulated signal.

8. A method for use in a receiver, the method comprising:
staggered quadrature amplitude modulating a received signal for providing a staggered quadrature amplitude modulated signal;
tracking a carrier frequency in the staggered quadrature amplitude modulated signal with a carrier tracking loop;
tracking symbol timing in the staggered quadrature amplitude modulated signal with a symbol time loop; wherein the tracking symbol timing step comprises the steps of
filtering a signal derived from the staggered quadrature amplitude modulated signal to remove a phase response symmetry in the signal for providing a filter output signal, wherein the filtering is sensitive to a timing phase offset, while keeping the filter insensitive to a carrier phase offset, and wherein the filtering performs Hilbert filtering that operates on a real signal component of the signal derived from the staggered quadrature amplitude modulated signal; and
detecting timing phase differences as a function of the filter output signal for driving a symbol timing recovery loop.

9. The method of claim 8, further comprising:
derotating the staggered quadrature amplitude modulated signal for providing a derotated staggered quadrature amplitude modulated signal;
interpolating the derotated staggered quadrature amplitude modulated signal for providing an interpolated signal;
demodulating the interpolated signal for providing a demodulated signal; and
equalizing the demodulated signal for providing an equalized signal;
wherein the filtering step removes the phase response symmetry from the equalized signal.

10. The method of claim 9, wherein the demodulating step comprises:
converting the interpolated signal back to a vestigial sideband modulated signal before providing the demodulated signal.

11. The method of claim 8, further comprising:
derotating the staggered quadrature amplitude modulated signal for providing a derotated staggered quadrature amplitude modulated signal;
interpolating the derotated staggered quadrature amplitude modulated signal for providing an interpolated signal; and
demodulating the interpolated signal for providing a demodulated signal;
wherein the filtering step removes the phase response symmetry from the demodulated signal.

12. The method of claim 11, wherein the demodulating step comprises:
converting the interpolated signal back to a vestigial sideband modulated signal before providing the demodulated signal.

13. The method of claim 8, wherein the received signal is an ATSC (Advanced Television Systems Committee) VSB (Vestigial Sideband) modulation signal.

14. The apparatus of claim 3, wherein the equalizer provides a training signal and the symbol timing recovery loop is driven as a function of a phase difference between the equalized signal and the training signal.

15. The apparatus of claim 5, wherein the data-aided symbol timing recovery loop further comprises an equalizer for equalizing the demodulated signal for providing an equalized signal and a training signal and wherein the symbol timing recovery loop is driven as a function of a phase difference between the equalized signal and the training signal.

16. The method of claim 9, wherein the equalizing step provides a training signal and the symbol timing recovery loop is driven as a function of a phase difference between the equalized signal and the training signal.

17. The method of claim 11 further comprising equalizing the demodulated signal for providing an equalized signal and a training signal, wherein the symbol timing recovery loop is driven as a function of a phase difference between the equalized signal and the training signal.

* * * * *